US010585410B2

(12) United States Patent
Ukena et al.

(10) Patent No.: US 10,585,410 B2
(45) Date of Patent: Mar. 10, 2020

(54) FUNCTIONAL UNIT AND CONTROL APPARATUS WHEREIN A FUNCTIONAL UNIT SYNCHRONIZED WITH ANOTHER FUNCTIONAL UNIT ON BASIS OF AN OUTSIDE TRIGGER SIGNAL HAVING A SYNCHRONIZED PERIOD

(71) Applicant: Mitsubishi Electric Corporation, Chiyoda-ku (JP)

(72) Inventors: Satoru Ukena, Chiyoda-ku (JP); Yuta Takenaka, Chiyoda-ku (JP); Tomihito Goto, Chiyoda-ku (JP); Tatsuro Onishi, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/760,395

(22) PCT Filed: Nov. 5, 2015

(86) PCT No.: PCT/JP2015/081232
§ 371 (c)(1),
(2) Date: Mar. 15, 2018

(87) PCT Pub. No.: WO2017/077628
PCT Pub. Date: May 11, 2017

(65) Prior Publication Data
US 2019/0056705 A1  Feb. 21, 2019

(51) Int. Cl.
*G05B 11/01* (2006.01)
*G05B 19/042* (2006.01)
(Continued)

(52) U.S. Cl.
CPC ......... *G05B 19/042* (2013.01); *G05B 19/056* (2013.01); *G06F 1/12* (2013.01);
(Continued)

(58) Field of Classification Search
CPC ..................................................... G05B 15/02
(Continued)

(56) References Cited

U.S. PATENT DOCUMENTS 8,265,101 B2 * 9/2012 Cho ................. G05B 19/41815
370/503
2009/0290073 A1 * 11/2009 Sagawa ............... G09G 3/3611
348/744

(Continued)

FOREIGN PATENT DOCUMENTS

JP  10-240306 A  9/1998
JP  11-31006 A  2/1999
(Continued)

OTHER PUBLICATIONS

Combined Office Action and Search Report dated Mar. 14, 2018 in Taiwanese Patent Application No. 105135321 (with English translation).
(Continued)

*Primary Examiner* — Suresh Suryawanshi
(74) *Attorney, Agent, or Firm* — Oblon, McClelland, Maier & Neustadt, L.L.P.

(57) ABSTRACT

A functional unit is synchronized with an output system unit on the basis of a trigger signal input from outside with a synchronization period. The input system unit includes: a functional processing unit to perform, on the basis of the trigger signal, a functional process with a control period that is shorter than the synchronization period, and to generate processing results by repeatedly performing the functional process in one synchronization period; and a shared memory to collectively output the processing results of the functional processing unit to outside on the basis of the trigger signal.

10 Claims, 12 Drawing Sheets

(51) Int. Cl.
    *G06F 1/12* (2006.01)
    *G05B 19/05* (2006.01)
(52) U.S. Cl.
    CPC .............. *G05B 2219/25252* (2013.01); *G05B 2219/25474* (2013.01); *Y02P 90/02* (2015.11)
(58) Field of Classification Search
    USPC .......................................................... 700/19
    See application file for complete search history.

(56) References Cited

U.S. PATENT DOCUMENTS

| | | |
|---|---|---|
| 2013/0254584 A1 | 9/2013 | Tamaoki |
| 2013/0331955 A1 | 12/2013 | Kwon |
| 2015/0156736 A1* | 6/2015 | Guo .................... H04W 56/001 370/350 |
| 2015/0156738 A1* | 6/2015 | Guo .................... H04W 56/002 709/236 |

FOREIGN PATENT DOCUMENTS

| | | |
|---|---|---|
| JP | 2000-242317 A | 9/2000 |
| JP | 2006-285885 A | 10/2006 |
| JP | 2011-170476 A | 9/2011 |
| JP | 5301041 B2 | 9/2013 |
| JP | 2013-254487 A | 12/2013 |

OTHER PUBLICATIONS

International Search Report dated Dec. 8, 2015 in PCT/JP2015/081232 filed Nov. 5, 2015.

Notification of Reasons for Refusal dated Aug. 14, 2017 in Taiwanese Patent Application No. 105135321 (with English Translation), 13 pages.

Notification of Reasons for Refusal dated Jan. 25, 2018 in Japanese Patent Application No. 2017-548584 (with English Translation), 5 pages.

* cited by examiner

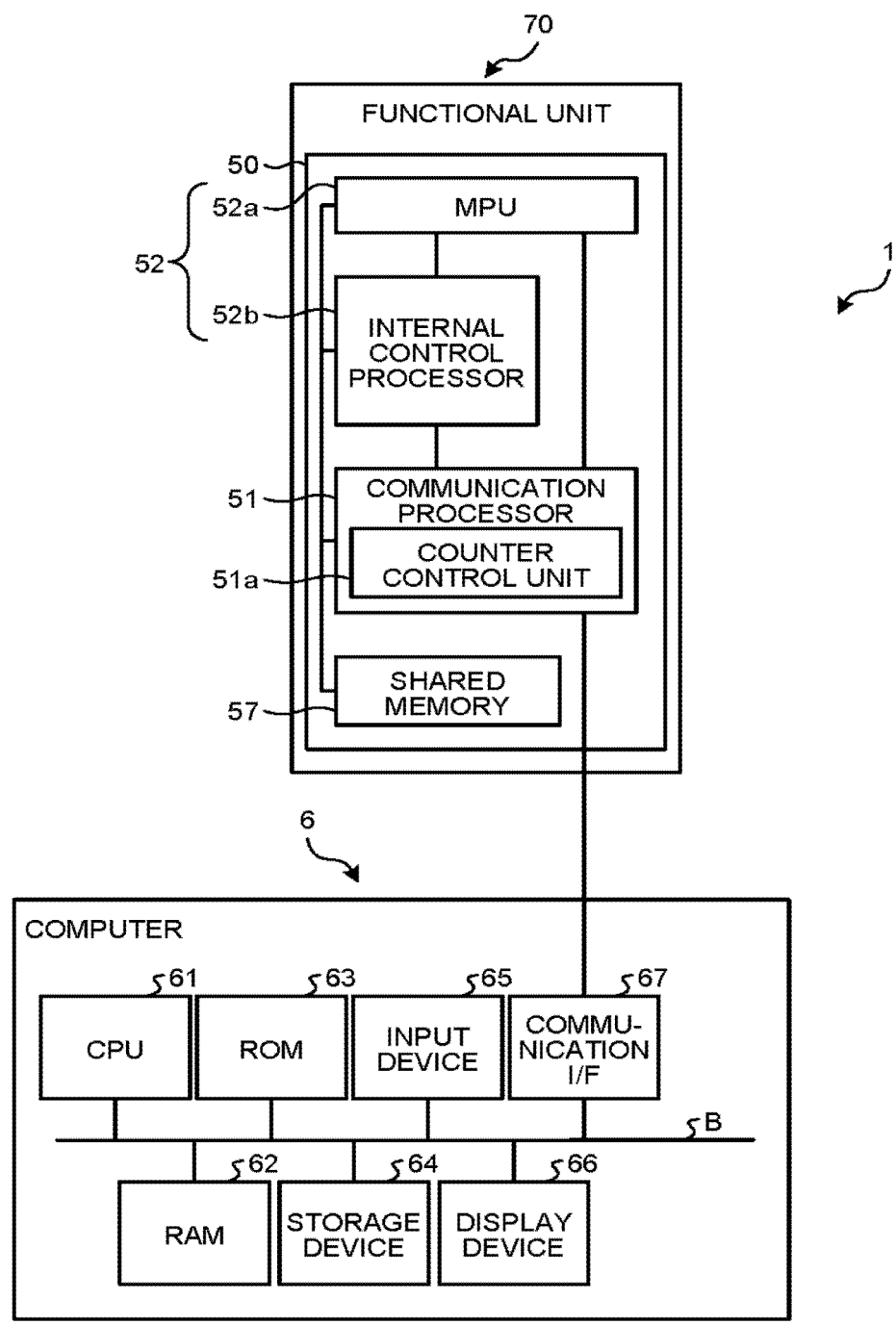

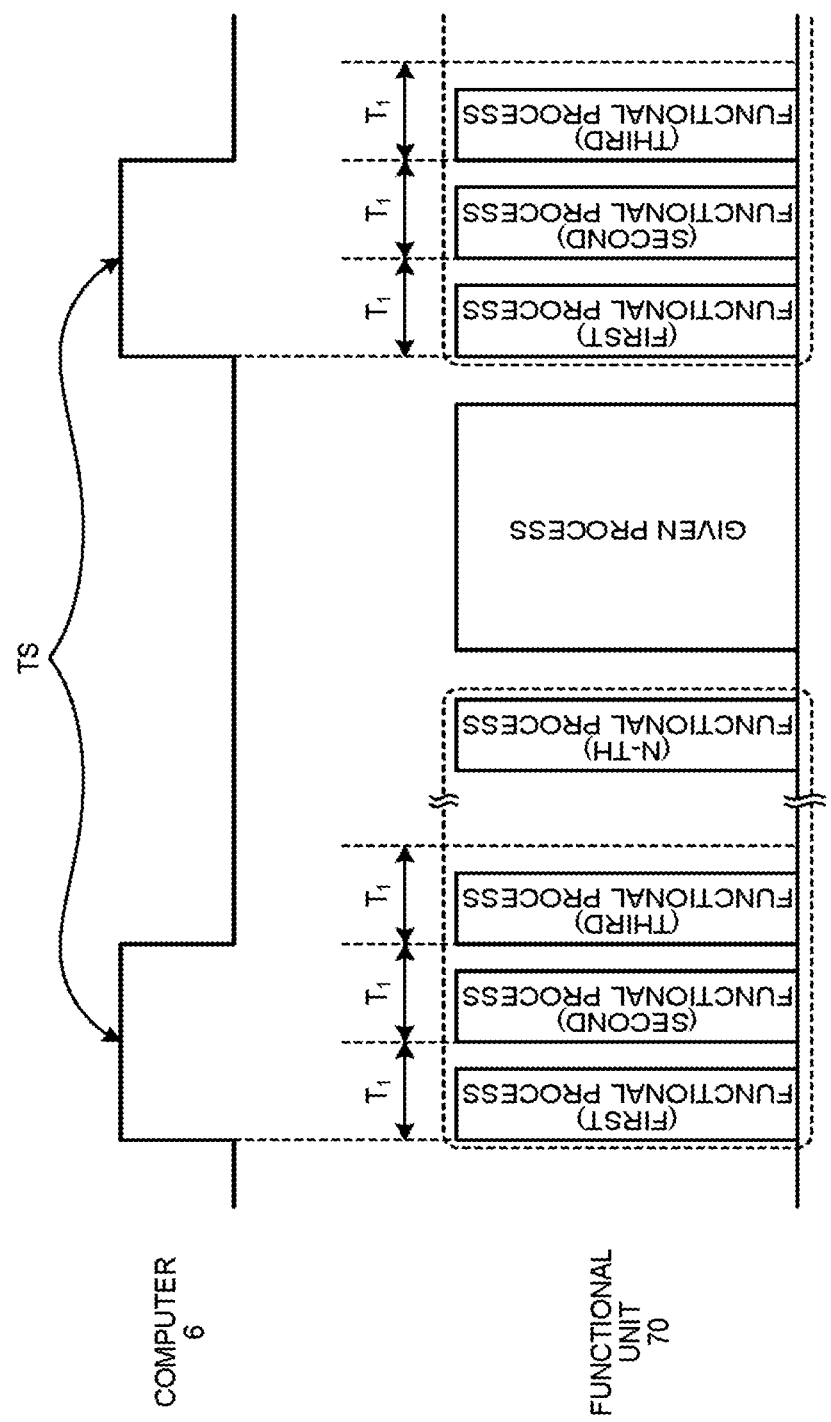

FUNCTIONAL UNIT AND CONTROL APPARATUS WHEREIN A FUNCTIONAL UNIT SYNCHRONIZED WITH ANOTHER FUNCTIONAL UNIT ON BASIS OF AN OUTSIDE TRIGGER SIGNAL HAVING A SYNCHRONIZED PERIOD

FIELD

The present invention relates to a functional unit synchronized with another unit and a control apparatus.

BACKGROUND

A facility in the field of Factory Automation (FA) is generally achieved by combining multiple types of devices. The devices constituting the facility in the FA field are connected to programmable controllers, each of which is a control apparatus integrating a control process and an information process. The programmable controllers are distributed in the facility in the FA field. The distributed programmable controllers are synchronized on the basis of a trigger signal input with a fixed synchronization period from a communication bus (see Patent Literature 1).

CITATION LIST

Patent Literature

Patent Literature 1: Japanese Patent Application Laid-open No. 2006-285885

SUMMARY

Technical Problem

As a functional unit constituting a programmable controller, a functional unit is proposed which can perform a functional process with a control period is shorter than a synchronization period of a trigger signal. However, in a programmable controller disclosed in Patent Literature 1, since a functional unit performs only one functional process in one synchronization period, high-speed functional processing performance of the functional unit cannot be utilized, which is a problem. Furthermore, in a case where multiple input units and output units, which are functional units, are connected to a CPU unit, there is a method for solving the problem in which synchronization control is started using a trigger signal input in a first synchronization period, and thereafter, high-speed control is performed depending on the control period of an internal control processor installed in each unit. However, since variations in the control period are generated in each internal control processor, in a case of performing long-term control, the variations will eventually increase to a non-negligible level, which causes other problems.

The present invention has been made in view of the above, and it is an object of the present invention to obtain a functional unit that makes it possible to utilize high-speed functional processing performance and to suppress variations in the control period.

Solution to Problem

In order to solve the above-described problem and achieve the object, an aspect of the present invention is a functional unit synchronized with another unit on the basis of a trigger signal input from outside with a synchronization period. The functional unit includes a functional processing unit to perform, on the basis of the trigger signal, a functional process with a control period that is shorter than the synchronization period, and to generate processing results by repeatedly performing the functional process in one synchronization period. The functional unit includes an output control unit to collectively output the processing results of the functional processing unit on the basis of the trigger signal.

Advantageous Effects of Invention

The functional unit according to the present invention has an effect where it is possible to utilize high-speed functional processing performance and to suppress variations in the control period.

BRIEF DESCRIPTION OF DRAWINGS

FIG. 12 is a diagram illustrating a hardware configuration of a functional unit according to a third embodiment.

FIG. 13 is a time chart illustrating an example of an operation of the functional unit according to the third embodiment.

DESCRIPTION OF EMBODIMENTS

Hereinafter, a functional unit and a control apparatus according to embodiments of the present invention will be described in detail with reference to the drawings. The invention is not limited to the embodiments.

First Embodiment

Figure 1:
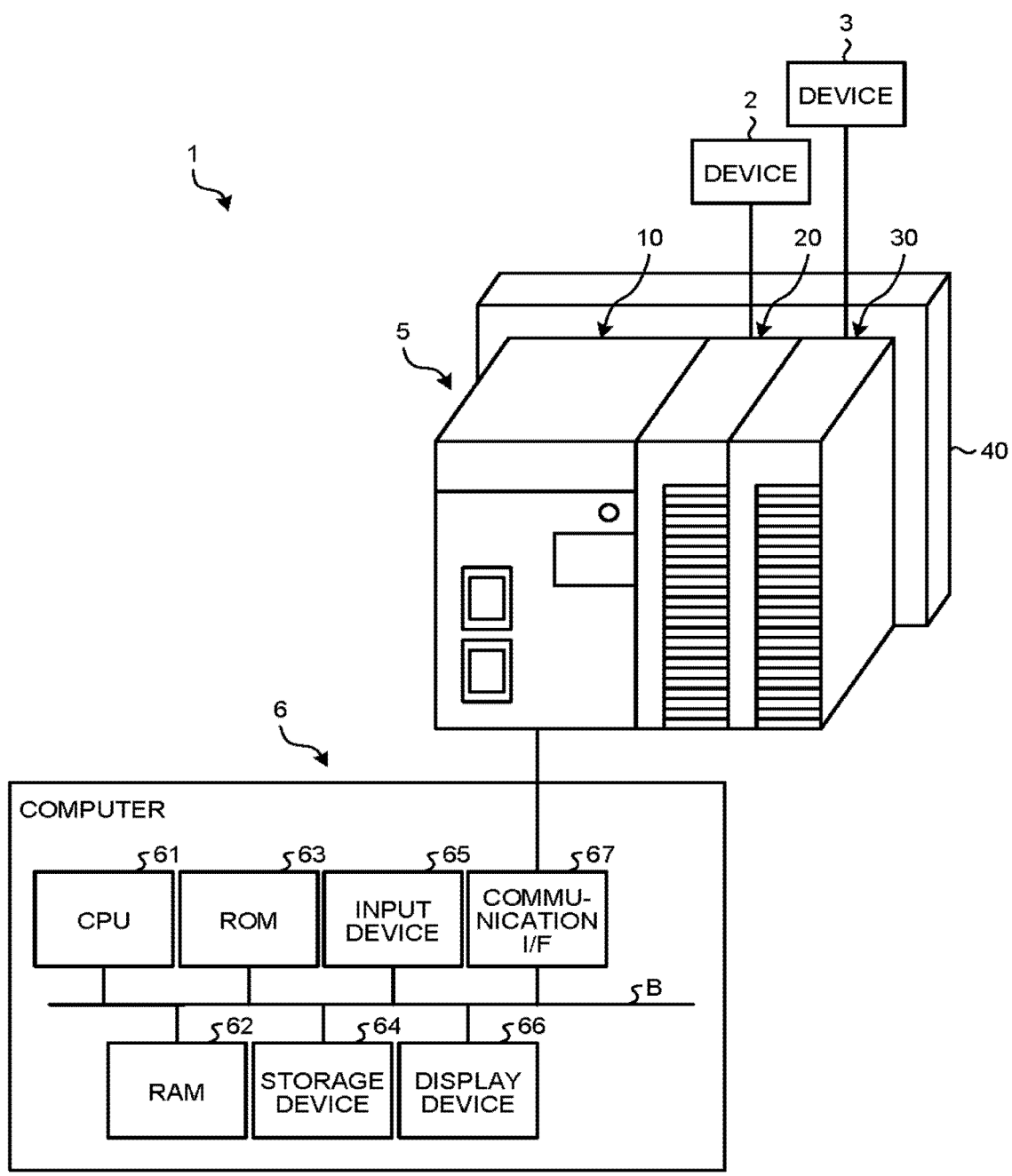
FIG. 1 is a diagram illustrating a configuration of a control system that includes a control apparatus according to a first embodiment.

FIG. 1 is a diagram illustrating a configuration of a control system that includes a control apparatus according to a first embodiment. The control system 1 constitutes a facility in the field of Factory Automation (FA), and includes, as illustrated in FIG. 1, a plurality of devices 2 and 3 installed in the facility; a control apparatus 5 connected to the devices 2 and 3; and a computer 6 connected to the control apparatus 5. In the first embodiment, the control system 1 includes two devices 2 and 3, but the number of devices installed in the facility is not limited to two. In the first embodiment, the device 2 is a sensor that is installed in the facility and detects the flow rate, pressure, concentration, or temperature, and the device 3 is a drive device that performs operations, such as a switch, a regulating valve, a solenoid valve, a motor, or a pump installed in the facility.

The computer 6 generates a control program to be executed by the control apparatus 5 and transmits the control program to the control apparatus 5. The control apparatus 5 controls devices 2 and 3 by executing the control program. In the first embodiment, the control apparatus 5 is a programmable controller (PLC). The programmable controller is defined by Japan Industrial Standard (JIS) B 3502:2011.

The computer 6 according to the first embodiment executes a computer program, and includes, as illustrated in FIG. 1, a Central Processing Unit (CPU) 61, a Random Access Memory (RAM) 62, a Read Only Memory (ROM) 63, a storage device 64, an input device 65, a display device 66, and a communication interface 67. The CPU 61, the RAM 62, the ROM 63, the storage device 64, the input device 65, the display device 66, and the communication interface 67 are connected to one another via a bus B.

The CPU 61 executes a program stored in the ROM 63 and the storage device 64 using the RAM 62 as a work area. The program stored in the ROM 63 is a Basic Input/Output System (BIOS) or a Unified Extensible Firmware Interface (UEFI), but the program stored in the ROM 63 is not limited to the BIOS or the UEFI. In the first embodiment, the program stored in the storage device 64 is an operating system program and an engineering tool program, but the program stored in the storage device 64 is not limited to the operating system program and the engineering tool program. In the first embodiment, the storage device 64 is an SSD or an HDD, but the storage device 64 is not limited to the SSD or the HDD.

The input device 65 receives an operation input from a user. In the first embodiment, the input device 65 is a keyboard or a mouse, but is not limited to the keyboard or the mouse. The display device 66 displays characters and images. In the first embodiment, the display device 66 is a liquid crystal display device, but is not limited to the liquid crystal display device. The communication interface 67 communicates with the control apparatus 5.

Figure 2:
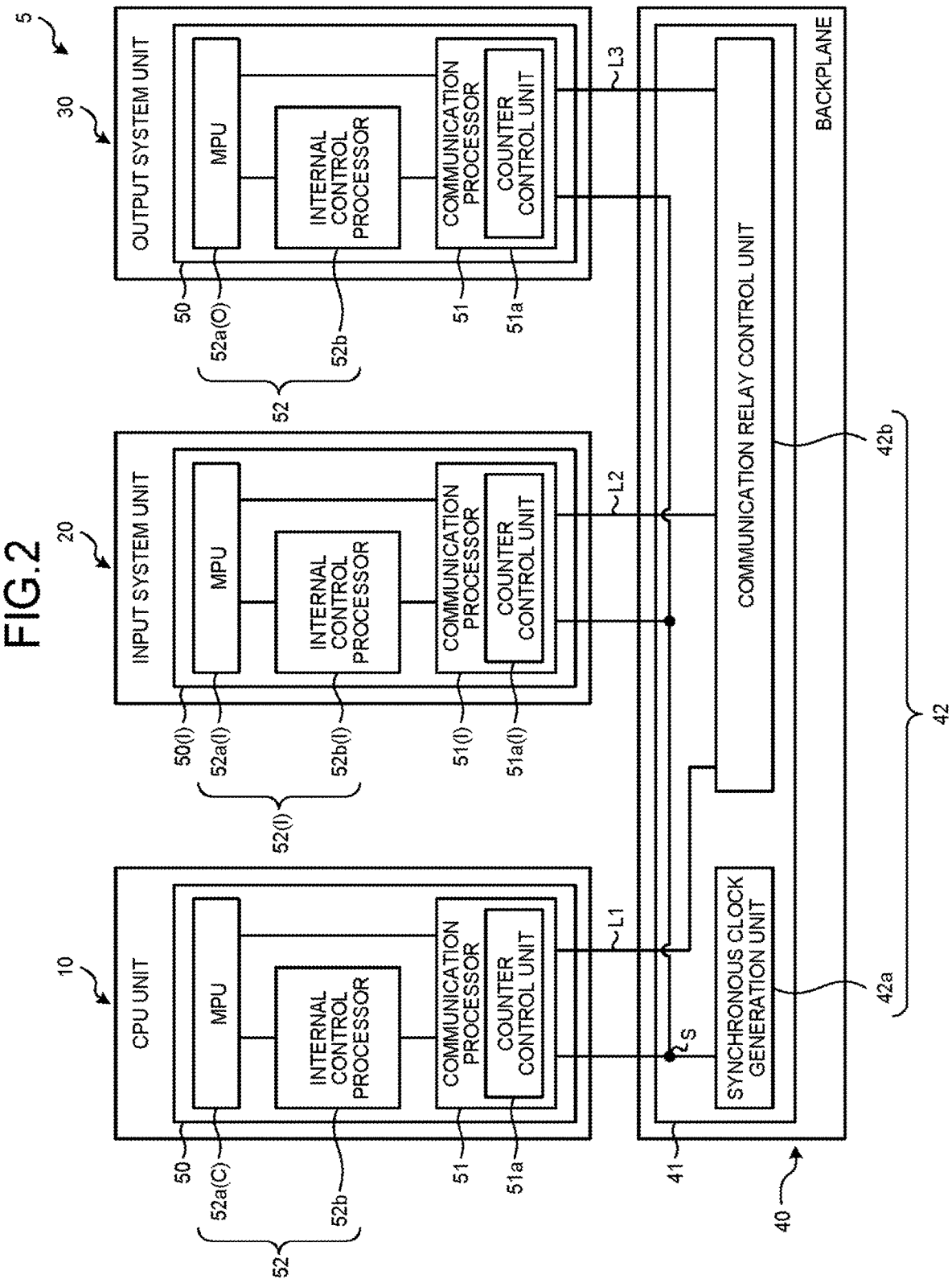
FIG. 2 is a diagram illustrating a hardware configuration of the control apparatus according to the first embodiment.

FIG. 2 is a diagram illustrating a hardware configuration of the control apparatus according to the first embodiment. As illustrated in FIG. 2, the control apparatus 5 includes a CPU unit 10 and an input system unit 20. The CPU unit 10 is a processing unit that processes and executes a control program. The input system unit 20 is connected to the device 2, which is a sensor, and performs a functional process for processing a detection result of the device 2. The control apparatus 5 further includes an output system unit 30 and a backplane 40. The output system unit 30 is connected to the device 3, which is a drive device, and transmits a control signal to the device 3. The backplane 40 connects the CPU unit 10, the input system unit 20, and the output system unit 30 to one another.

The backplane 40 has a flat-plate shape. A plurality of slots (not illustrated) in which the CPU unit 10, the input system unit 20, and the output system unit 30 are installed are provided on the surface portion of the backplane 40. Any one of the CPU unit 10, the input system unit 20, and the output system unit 30 is installed in each slot of the backplane 40. The positions in the backplane 40 in which the CPU unit 10, the input system unit 20, and the output system unit 30 are installed can be appropriately selected. The control apparatus 5 is operable even if there is a slot in which none of the CPU unit 10, the input system unit 20, and the output system unit 30 is installed in the backplane 40.

The backplane 40 includes a circuit board 41 and a control circuit 42 mounted on the circuit board 41. The control circuit 42 includes a synchronous clock generation unit 42a and a communication relay control unit 42b. The synchronous clock generation unit 42a is constituted by a circuit that allows synchronization control of the CPU unit 10, the input system unit 20, and the output system unit 30 and transmits a trigger signal TS with a fixed synchronization period T illustrated in FIG. 5. The communication relay control unit 42b is constituted by a circuit for performing data transmission and reception among the CPU unit 10, the input system unit 20, and the output system unit 30.

The synchronous clock generation unit 42a is connected to the CPU unit 10, the input system unit 20, and the output system unit 30 by electric signal lines S. The synchronous clock generation unit 42a generates a trigger signal TS for allowing synchronization control with the fixed synchronization period T and simultaneously transmits the generated trigger signals TS to the CPU unit 10, the input system unit 20, and the output system unit 30 with the synchronization period T.

The communication relay control unit 42b is connected to the CPU unit 10, the input system unit 20, and the output system unit 30 by bus communication lines L1, L2, and L3 that are provided separately from the electric signal lines S. The communication relay control unit 42b relays data transmission and reception among the CPU unit 10, the input system unit 20, and the output system unit 30.

In the first embodiment, the input system unit 20 is a functional unit, and the output system unit 30 is another unit. Next, since the CPU unit 10, the input system unit 20, and the output system unit 30 are similarly configured, a configuration common to the CPU unit 10, the input system unit 20, and the output system unit 30 will be described with reference to FIG. 2. As illustrated in FIG. 2, the CPU unit 10, the input system unit 20, and the output system unit 30 each include a circuit hoard 50, a communication processor 51 mounted on the circuit board 50, and a functional processing unit 52 as a functional processing unit mounted on the circuit board 50.

The communication processors 51 of the CPU unit 10, the input system unit 20, and the output system unit 30 are connected to one another via the bus communication lines L1, L2, and L3 and the communication relay control unit 42b. The communication processors 51 perform data transmission and reception among the CPU unit 10, the input system unit 20, and the output system unit 30. Furthermore, the communication processors 51 are connected to the synchronous clock generation unit 42a via the electric signal lines S.

In the first embodiment, each communication processor 51 includes a counter control unit 51a constituted by a counter in a similar manner to the technology described in Japanese Patent No. 5301041. The counter control unit 51a has a built-in circuit that resets a value of the counter to zero upon receiving the trigger signal TS via the electric signal line S. In the first embodiment, the counter control unit 51a resets the value of the counter to zero at a rising timing of the trigger signal TS, but the counter control unit 51a may reset the value the counter to zero at a falling timing of the trigger signal TS.

When the value of the counter counted by the counter control unit 51a reaches a given value, the communication processor 51 generates an interrupt signal and transmits the generated interrupt signal to the functional processing unit 52. The given value is set by the functional processing unit 52 of the CPU unit 10. The interrupt signal is a signal for causing the functional processing unit 52 to execute a computer program. Given values that cause the communication processors 51 of the CPU unit 10, the input system unit 20, and the output system unit 30 to generate the interrupt signals are the same. In the first embodiment, the given value is "zero", but is not limited to "zero". In the first embodiment, in a similar manner to the technology described in Japanese Patent No. 5301041, the communication processor 51 generates an interrupt signal when the value of the counter counted by the counter control unit 51a reaches a given value, but this technology is not a limitation.

The given values of the counters that cause the communication processors 51 of the CPU unit 10, the input system unit 20, and the output system unit 30 to generate the interrupt signals are made equal to one another, the synchronous clock generation unit 42a simultaneously transmits the trigger signals TS to the communication processors 51 of the CPU unit 10, the input system unit 20, and the output system unit 30, and thereby the functional processing units 52 of the CPU unit 10, the input system unit 20, and the output system unit 30 execute the computer program in synchronization with each other. Through the synchronization of the functional processing units 52 by the communication processors 51, the input system unit 20 is synchronized with the output system unit 30 on the basis of the trigger signal TS input from the outside of the input system unit 20 with the fixed synchronization period T. Through the synchronization of the functional processing units 52 by the communication processors 51, the output system unit 30 is synchronized with the input system unit 20 on the basis of the trigger signal TS input from the outside of the output system unit 30 with the fixed synchronization period T. In the first embodiment, the communication processor 51 is constituted by an Application Specific Integrated Circuit (ASIC) or a Field-Programmable Gate Array (FPGA), but is not limited to the ASIC or the FPGA. FPGA.

The functional processing unit 52 includes a Microprocessing unit (MPU) 52a that stores a computer program and an internal control processor 52b that performs a hardware process. In cooperation with the internal control processor 52b, the MPU 52a executes the stored computer program upon receiving the interrupt signal. The internal control processor 52b of the input system unit 20 performs a functional process for processing the detection result input from the device 2 and uses the processing result generated by the functional process as data to be transmitted and received among the CPU unit 10, the input system unit 20, and the output system unit 30. The internal control processor 52b of the output system unit 30 performs a functional process for processing a processing target that is information input from the computer 6 via the CPU unit 10, and transmits the processing result generated by the functional process to the device 3 as a control signal. In the first embodiment, the internal control processor 52b is constituted by an ASIC or an FPGA, but is not limited to the ASIC or the FPGA.

Figure 5:
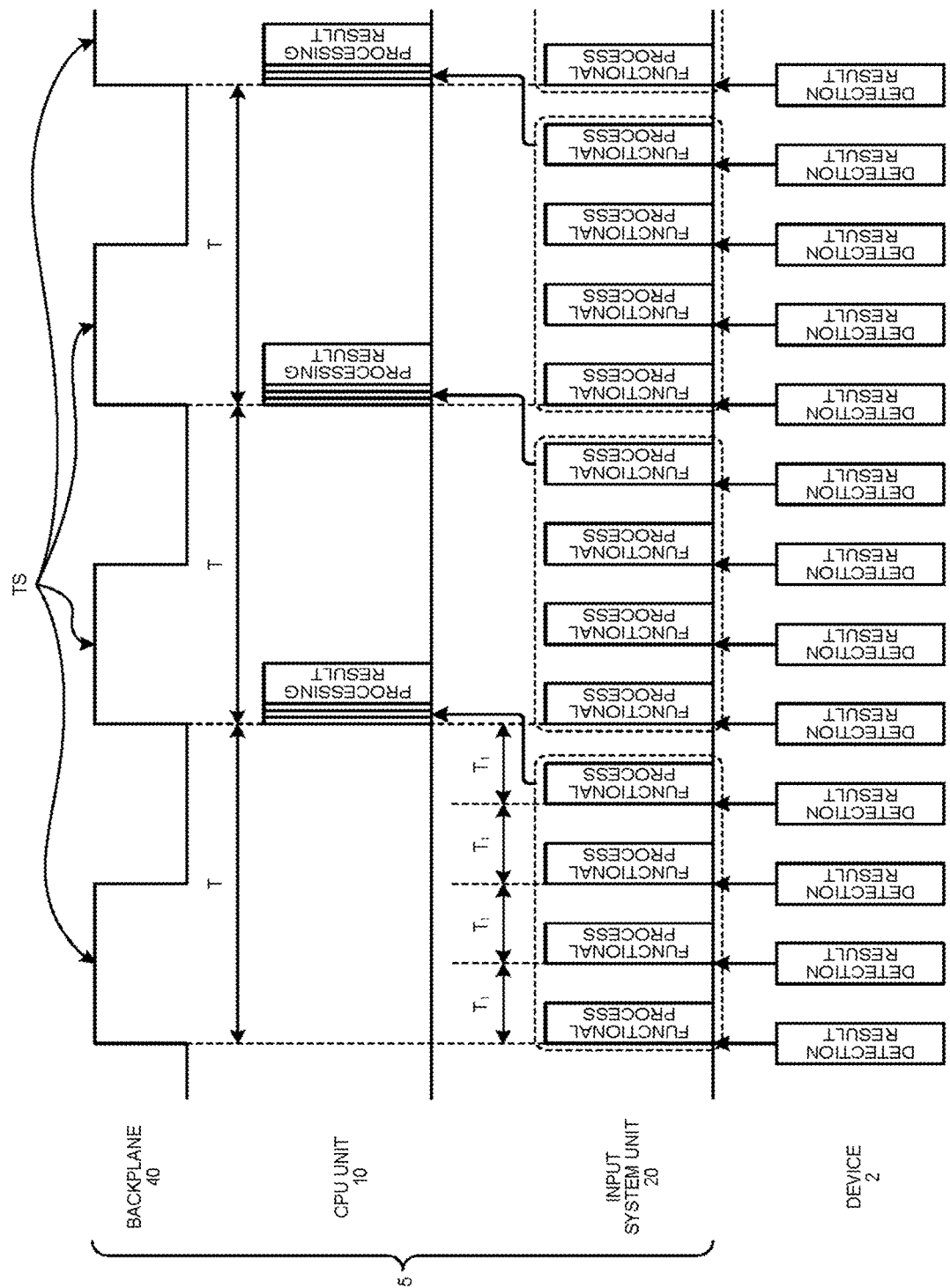
FIG. 5 is a time chart illustrating an example of an operation of the control apparatus according to the first embodiment.

The functional processing units 52 of the input system unit 20 and the output system unit 30 each include the MPU 52a that stores the computer program and the internal control processor 52b that performs a hardware process, and thereby the functional process of each internal control processor 52b can be performed with a control period T1 illustrated in FIG. 5, which is shorter than the synchronization period T of the trigger signal TS, and the processing result of each internal control processor 52b can be generated. In the first embodiment, through the synchronization of the functional processing units 52 by the communication processors 51, the functional processing units 52 of the input system unit 20 and the output system unit 30 repeatedly perform a functional process of the internal control processors 52b a plurality of times in the synchronization period T of the trigger signal TS on the basis of the trigger signal TS input from the outside with the fixed synchronization period T; therefore, a plurality of processing results are generated.

In the first embodiment, when the value of the counters counted by the counter control units 51a becomes "zero", the functional processing units 52 of the input system unit 20 and the output system unit 30 each receive the interrupt signal transmitted by the communication processor 51, and the internal control processors 52b perform the functional process. Therefore, in the first embodiment, the functional processing units 52 of the input system unit 20 and the output system unit 30 each repeatedly perform the functional process starting from the trigger signal TS. In the first embodiment, when the control period is denoted by T1, and the number of functional processes performed by each of the functional processing units 52 of the input system unit 20 and the output system unit 30 in one synchronization period T is denoted by N, the functional processing units 52 of the input system unit 20 and the output system unit 30 satisfy the following formula 1.

$$T > T1 \times N \qquad \text{Formula 1}$$

Figure 3:
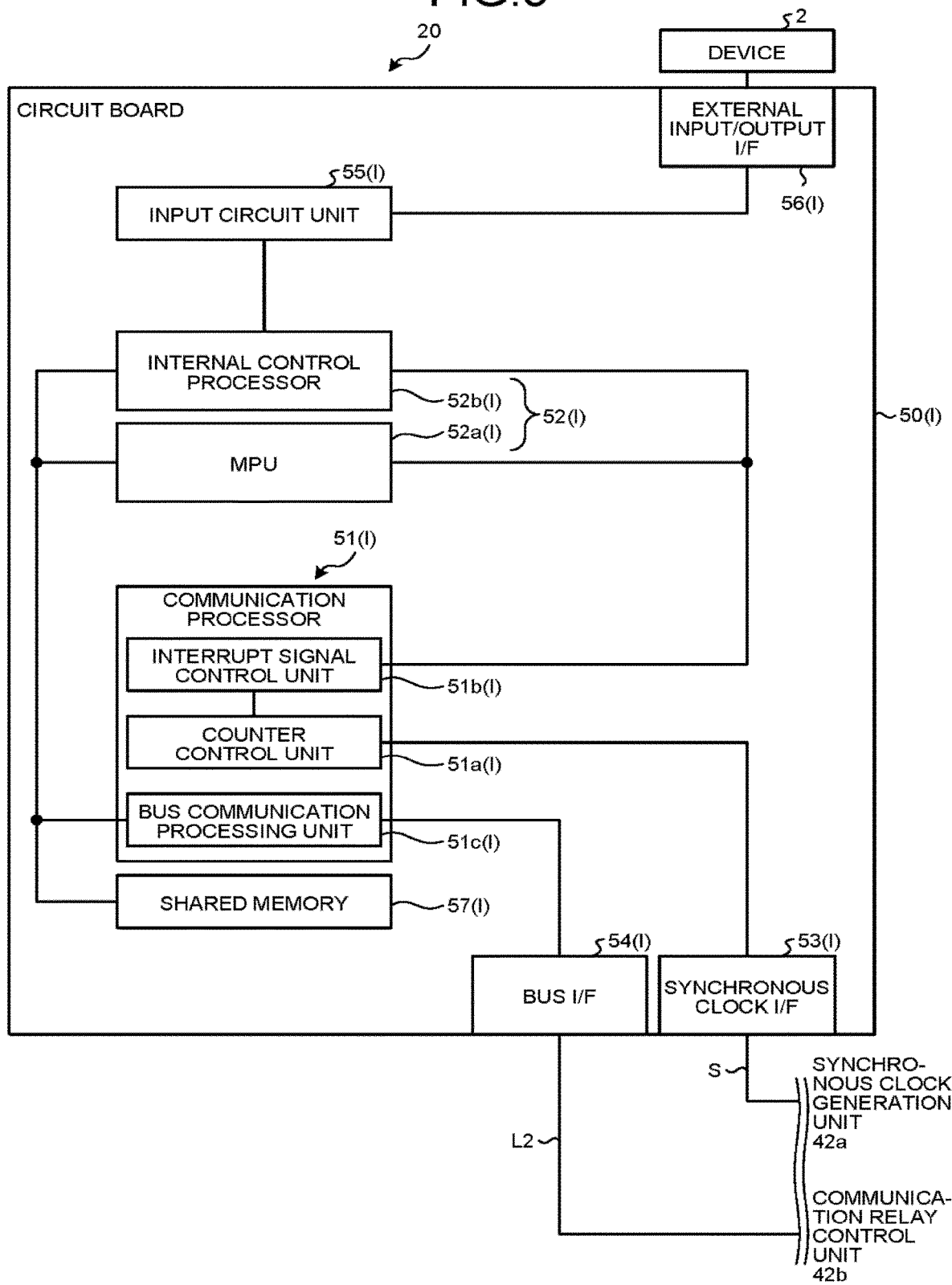
FIG. 3 is a diagram illustrating a hardware configuration of an input system unit of the control apparatus according to the first embodiment.

Hereinafter, with respect to the components of the CPU unit 10, the input system unit 20, and the output system unit 30, "(C)" is appended to the end of the reference signs of the components that can be identified as components of the CPU unit 10, "(I)" is appended to the end of the reference signs of the components that can be identified as components of the input system unit 20, and "(O)" is appended to the end of the reference signs of the components that can be identified as components of the output system unit 30. FIG. 3 is a diagram illustrating a hardware configuration of the input system unit of the control apparatus according to the first embodiment.

Next, with reference to FIG. 3, the configuration of the input system unit 20 omitted in FIG. 2 will be described. A communication processor 51(I) of the input system unit 20 includes an interrupt signal control unit 51b(I) and a bus communication processing unit 51c(I) in addition to a counter control unit 51a(I). The interrupt signal control unit 51b(I) is connected to the counter control unit 51a(I) and a functional processing unit 52(I). The interrupt signal control unit 51b(I) receives a value of the counter counted by the counter control unit 51a(I). When the value of the counter counted by the counter control unit 51a(I) reaches a given value set by the functional processing unit 52 of the CPU unit 10, the interrupt signal control unit 51b(I) generates an interrupt signal and transmits the interrupt signal to the functional processing unit 52(I). The bus communication processing unit 51c(I) is connected to the functional processing unit 52(I). The bus communication processing unit 51c(I) transmits and receives necessary data among the CPU unit 10, the input system unit 20, and the output system unit 30.

The input system unit 20 includes, as illustrated in FIG. 3, a synchronous clock interface 53(I) connected to the synchronous clock generation unit 42a and a bus interface 54(I) connected to the communication relay control unit 42b, in addition to a circuit board 50(I), the communication processor 51(I), and the functional processing unit 52(I). In addition, the input system unit 20 includes an input circuit unit 55(I) connected to the functional processing unit 52(I), an external input/output interface 56(I) connected to the device 2, and a shared memory 57(I).

The synchronous clock interface 53(I) is connected to the electric signal line S and the counter control unit 51a(I). The synchronous clock interface 53(I) causes the counter control unit 51a(I) of the communication processor 51(I) to receive the trigger signal TS generated by the synchronous clock generation unit 42a. The bus interface 54(I) is connected to the bus communication line L2 and the bus communication processing unit 51c(I).

The input circuit unit 55(I) is connected to an internal control processor 52b(I) of the functional processing unit 52(I). The input circuit unit 55(I) is constituted by an Analog/Digital (A/D) converter or a digital Input/Output (I/O). The external input/output interface 56(I) is connected to the device 2 and the input circuit unit 55(I). The detection result of the device 2, which is a sensor, is received by the input circuit unit 55(I) through the external input/output interface 56(I). The detection result of the device 2 is received by the internal control processor 52b(I), and a functional process thereof is performed by the internal control processor 52b(I).

Figure 4:
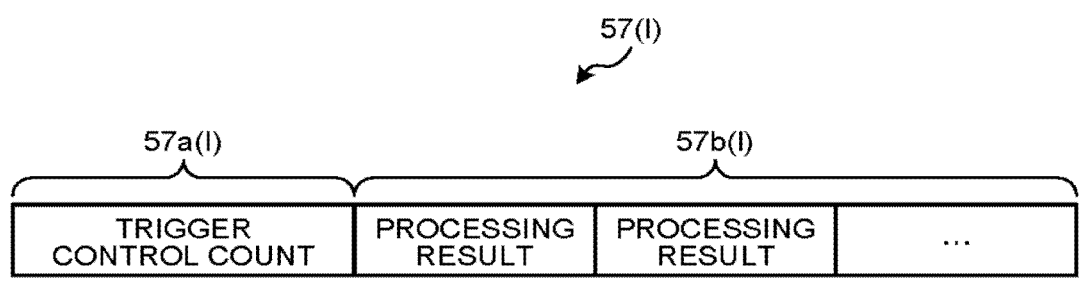
FIG. 4 is a diagram illustrating a storage area of a shared memory of the input system unit of the control apparatus according to the first embodiment.

The shared memory 57(I) is a storage device that stores data, and an MPU 52a(I) of the functional processing unit 52(I) of the input system unit 20, an MPU 52a(C) of the CPU unit 10, and an MPU 52a(O) of the output system unit 30 can access the shared memory 57(I). FIG. 4 is a diagram illustrating a storage area of the shared memory of the input system unit of the control apparatus according to the first embodiment. The shared memory 57(I) is connected to the functional processing unit 52(I) and the bus communication processing unit 51c(I) of the communication processor 51(I). In the first embodiment, the shared memory 57(I) is constituted by, but not limited to, a RAM.

As illustrated in FIG. 4, the shared memory 57(I) includes a trigger-control-count storage area 57a(I) and a processing result storage area 57b(I). The trigger-control-count storage area 57a(I) is a setting functional unit that stores the number of trigger controls N. The processing result storage area 57b(I) stores processing results of the internal control processor 52b(I) of the functional processing unit 52(I). The number of trigger controls N is the number of times the functional process is repeatedly performed by the functional processing unit 52(I) in the synchronization period T. In the first embodiment, the number of trigger controls N is written from the computer program stored in the MPU 52a(I) to the trigger-control-count storage area 57a(I). In the trigger-control-count storage area 57a(I), the number of trigger controls N written from the computer program stored in the MPU 52a(I) is referred to by the MPU 52a(I) of the functional processing unit 52(I). By storing the number of trigger controls N, the trigger-control-count storage area 57a(I) sets the number of trigger controls N, which is the number of times the functional process is performed by the functional processing unit 52(I) in one synchronization period T. In the first embodiment, the number of trigger controls N is written from the computer program stored in the MPU 52a(I), but the trigger-control-count storage area 57a(I) may be exposed and the number of trigger controls N may be written from the computer 6 via the CPU unit 10.

In the first embodiment, the processing results of the internal control processor 52b(I) are written by the MPU 52a(I) of the functional processing unit 52(I) to the processing result storage area 57b(I), but the processing results may be directly written by the internal control processor 52b(I). As many processing results as the number of trigger controls N are written to the processing result storage area 57b(I) in the order starting from the result of the process performed by the internal control processor 52b(I) first. In the first embodiment, as many processing results as the number of trigger controls N stored in the processing result storage area 57b(I) are acquired by the MPU 52a(C) of the CPU unit 10 at the timing of receiving a next trigger signal TS. However, the input system unit 20 may transmit, to the MPU 52a(C) of the CPU unit 10, as many processing results as the number of trigger controls stored in the shared memory 57(I) at the timing of receiving the next trigger signal TS. The address of the processing result storage area 57b(I) is set in the CPU unit 10 in advance. The CPU unit 10 reads as many processing results as the number of trigger controls N by reading values from an area of the preset address.

As many processing results as the number of trigger controls N are written to the shared memory 57(I) by the MPU 52a(I), as many processing results as the number of trigger controls N stored in the shared memory 57(I) are acquired by the MPU 52a(C) of the CPU unit 10 at the timing of receiving the next trigger signal TS, and thereby the shared memory 57(I) functions as an output control unit that collects and outputs, to the outside of the input system unit 20, multiple processing results of the functional processing unit 52(I) on the basis of the trigger signal TS. In the first embodiment, the expression "to collect multiple processing results" means that in the synchronization period T from when a trigger signal TS is input to when the next trigger signal TS is input, the multiple processing results are made acquirable by the CPU unit 10 that is an external unit or that the multiple processing results are transmitted to the CPU unit 10 that is an external unit. In the first embodiment, when the stored processing results are acquired by the MPU 52a(C) of the CPU unit 10, the processing result storage area 57b(I) of the shared memory 57(I) is cleared by the MPU 52a(C) of the CPU unit 10 so as to be in an empty state where no information is stored.

In the control apparatus 5 according to the first embodiment, the CPU unit 10 has the same configuration as the input system unit 20 illustrated in FIG. 3 except that the CPU unit 10 does not include the input circuit unit 55(I) and the external input/output interface 56(I). In the control apparatus 5 according to the first embodiment, the output system unit 30 has the same configuration as the input system unit 20 illustrated in FIG. 3 except that the output system unit 30 includes an output circuit unit constituted by a Digital/Analog (D/A) converter or a digital I/O instead of the input circuit unit 55(I).

Figure 6:
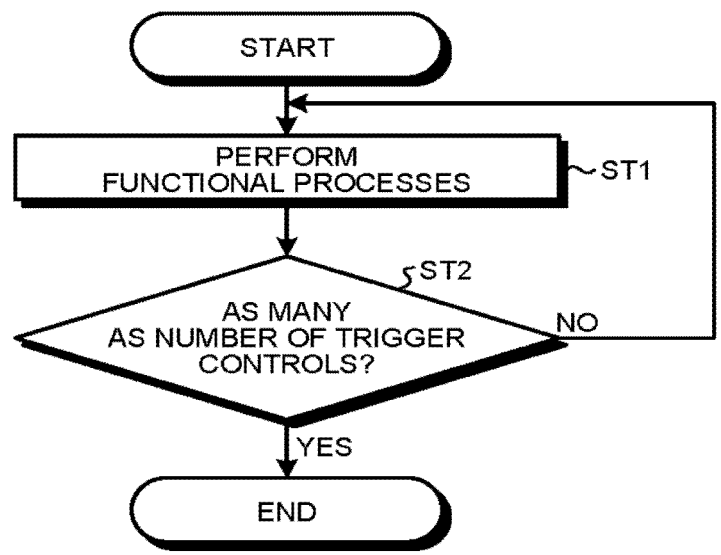
FIG. 6 is a flowchart illustrating an example of a process of a functional processing unit of the input system unit of the control apparatus according to the first embodiment.

Next, examples of operations of the input system unit 20 and the control apparatus 5 according to the first embodiment will be described with reference to the drawings. FIG. 5 is a time chart illustrating an example of the operation of the control apparatus according to the first embodiment. FIG. 6 is a flowchart illustrating an example of a process of the functional processing unit of the input system unit of the control apparatus according to the first embodiment.

As illustrated in FIG. 5, the trigger signal TS is input from the synchronous clock generation unit 42a of the backplane 40 to the control apparatus 5 according to the first embodiment with the fixed synchronization period T. When the trigger signal TS is input, the functional processing unit 52(I) of the input system unit 20 receives the interrupt signal at the rising timing of the trigger signal TS. The internal control processor 52b(I) performs the functional process on the detection result of the device 2 in each control period T1, and the MPU 52a(I) writes the processing results to the processing result storage area 57b(I) of the shared memory 57(I) (Step ST1). The MPU 52a(I) of the functional processing unit 52(I) refers to the number of trigger controls N stored in the trigger-control-count storage area 57a(I) of the shared memory 57(I), and determines whether as many functional processes as the number of trigger controls N have been ended (Step ST2).

When the MPU 52a(I) determines that as many functional processes as the number of trigger controls N have not been ended (Step ST2: No), the process returns to Step ST1. When the MPU 52a(I) determines that as many functional processes as the number of trigger controls N have been ended (Step ST2: Yes), the functional processes for one synchronization period T are ended. When it is determined that as many functional processes as the number of trigger controls N have not been ended (Step ST2: No), the functional processing unit 52(I) repeats Step ST1, thereby performing as many functional processes as the number of trigger controls N as illustrated in FIG. 5, and the functional processing unit 52(I) writes as many processing results as the number of trigger controls N to the processing result storage area 57b(I) of the shared memory 57(I).

When a next trigger signal TS is input to the control apparatus 5, as illustrated in FIG. 5, the CPU unit 10 acquires the processing results stored in the processing result storage area 57b(I) of the shared memory 57(I). In the first embodiment, the CPU unit 10 stores the acquired multiple processing results in the storage device 64 of the computer 6 in association with information indicating dates and times, but e process of the processing results acquired by the CPU unit 10 is not limited thereto. In the first embodiment, the CPU unit 10 is a processing unit that acquires and processes the multiple processing results collectively output by the shared memory 57(I) of the input system unit 20. When a next trigger signal TS is input to the control apparatus 5, as illustrated in FIG. 5, the input system unit 20 performs the functional process in a similar manner to when the previous trigger signal TS was input.

Figure 7:
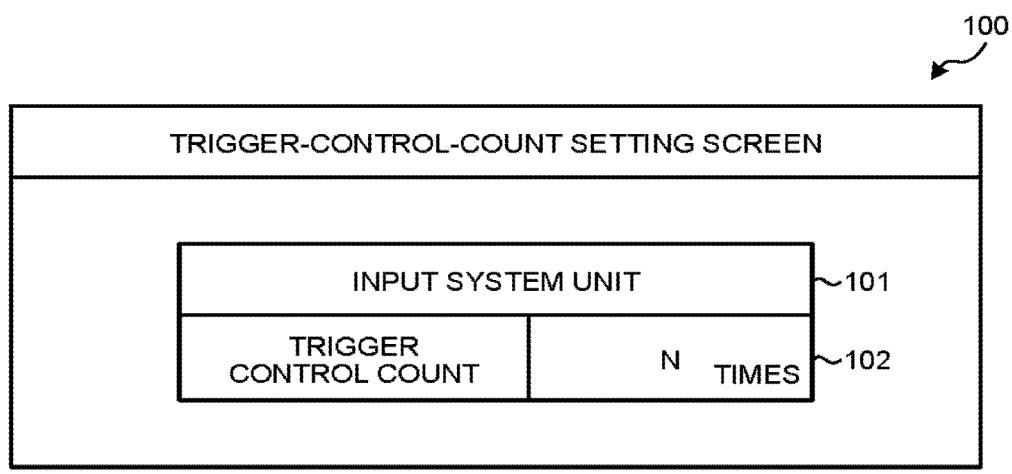
FIG. 7 is a diagram illustrating a screen for setting the number of trigger controls of the input system unit of the control apparatus according to the first embodiment.

FIG. 7 is a diagram illustrating a screen for setting the number of trigger controls of the input system unit 20 of the control apparatus 5 according to the first embodiment. When setting the number of trigger controls of the input system unit of the control apparatus according to the first embodiment, the user operates the input device 65 of the computer 6 to display a trigger-control-count setting screen 100 illustrated in FIG. 7 on the display device 66. As illustrated in FIG. 7, the trigger-control-count setting screen 100 at least includes a target unit display area 101 and a trigger-control-count setting area 102. The target unit display area 101 indicates "input system unit" as a unit name of a target for which the number of trigger controls N is set. The trigger-control-count setting area 102 sets "the number of trigger controls". When the user operates the input device 65 to perform an input operation of inputting the number of trigger controls N to the trigger-control-count setting area 102 and performs a determination operation to determine the input number of trigger controls N, the determined number of trigger controls N is transmitted to the CPU unit 10 through the communication interface 67 of the computer 6, transmitted to the communication processor 51 of the CPU unit 10, the bus communication line L1, the communication relay control unit 42b of the backplane 40, the bus communication line L2, and the communication processor 51(I) of the input system unit 20, in this order, and written to the trigger-control-count storage area 57a(I) of the shared memory 57(I) of the input system unit 20.

According to the input system unit 20 and the control apparatus 5 of the first embodiment, the functional processing unit 52(I) performs the functional process with the control period T1, which is shorter than the synchronization period T of the trigger signal TS, on the basis of the trigger signal TS. According to the input system unit 20 and the control apparatus 5, the processing results of the functional processing unit 52(I) are written to the shared memory 57(I), which enables the processing results to be collectively output. Therefore, in the input system unit 20 and the control apparatus 5, the functional processing unit 52(I) can perform the functional process a plurality of times in one synchronization period T and the processing results are written to the shared memory 57(I). Consequently, the processing results generated in one synchronization period T can be made available by external devices. As a result, the input system unit 20 and the control apparatus 5 can utilize the high-speed functional processing performance of the input system unit 20. According to the input system unit 20 and the control apparatus 5 of the first embodiment, it is possible to acquire the detection result of the device 2, which is a sensor, with a period shorter than the synchronization period T.

According to the input system unit 20 and the control apparatus of the first embodiment, since the functional processing unit 52(I) repeatedly performs the functional process starting from the trigger signal TS, it is possible to perform as many functional processes as possible in one synchronization period T. Furthermore, according to the input system unit 20 and the control apparatus 5 of the first embodiment, since the functional processing unit 52(I) repeatedly performs the functional process starting from the trigger signal TS, it is possible to suppress variations in the control period T1 generated by the internal control processors 52b(I) when a plurality of input system units 20 are arranged in the system. Therefore, when the input system units 20 are arranged in the system, the input system units 20 can be synchronized with each other with a period obtained by further minimizing the synchronization period T determined by the PLC system, and can be controlled permanently.

According to the input system unit 20 and the control apparatus 5 of the first embodiment, since the number of trigger controls N can be set in the trigger-control-count storage area 57a(I) of the shared memory 57(I), it is possible to change the number of functional processes performed in the synchronization period T. Regarding the input system unit 20 and the control apparatus 5 according to the first embodiment, the number of trigger controls N is written from the computer program stored in the MPU 52a(I). Therefore, even if the synchronization period T will be shortened in the future, the input system unit 20 and the control apparatus 5 according to the first embodiment can flexibly cope with the shortened synchronization period T without modifying the internal control processor 52b(I). When the number of trigger controls N is written from the computer 6 via the CPU unit 10, the input system unit 20 and the control apparatus 5 allow the user to freely set the control period of the functional processes minimized beyond the synchronization period T. However, the shortest control period of the functional processes is the control period T1.

According to the input system unit 20 and the control apparatus 5 of the first embodiment, since Formula 1 is satisfied, it is possible to prevent the functional process from being performed by the functional processing unit 52(I) over a plurality of synchronization periods T.

Second Embodiment

Figure 8:
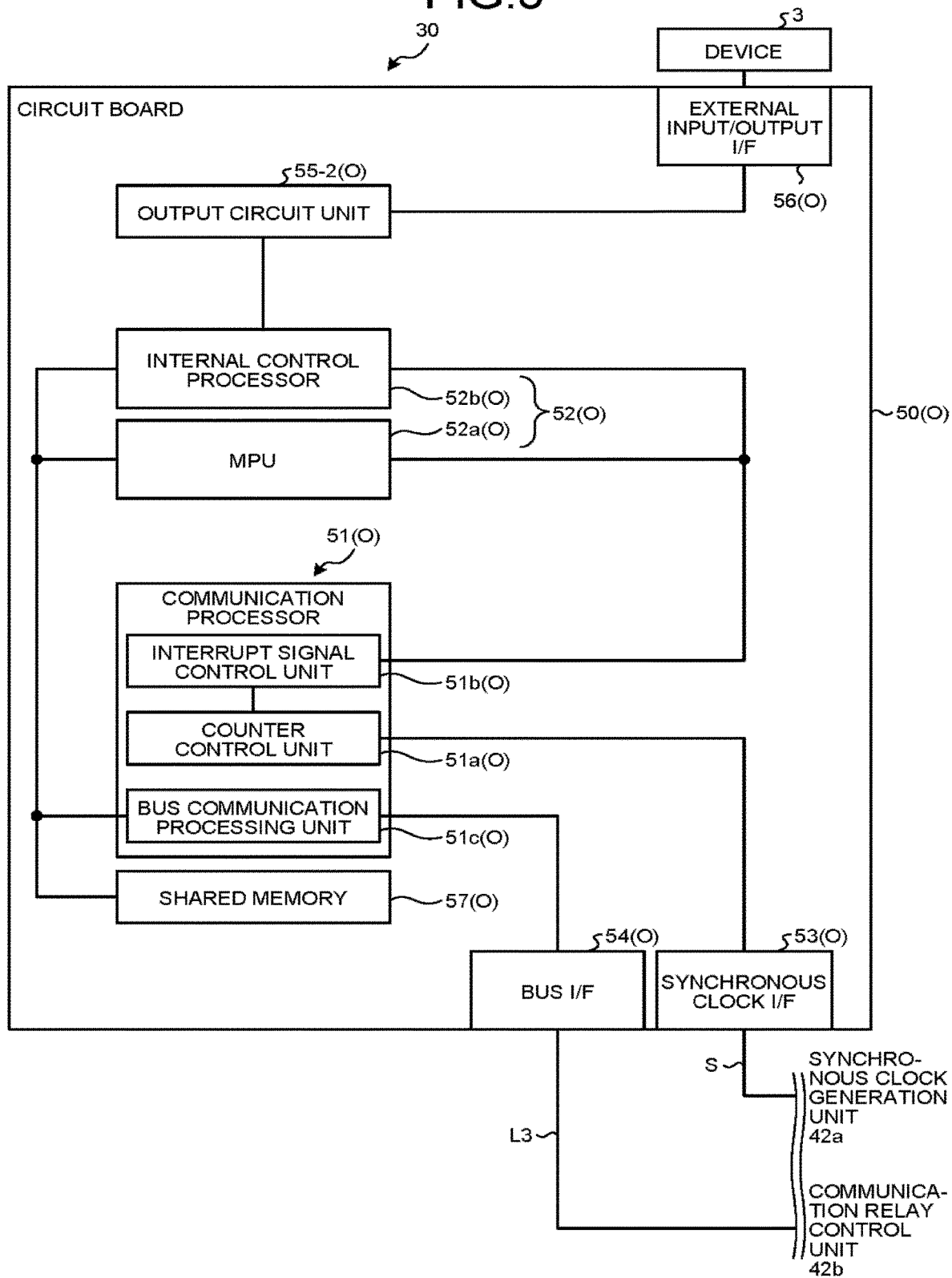
FIG. 8 is a diagram illustrating a hardware configuration of an output system unit of a control apparatus according to a second embodiment.
Figure 9:
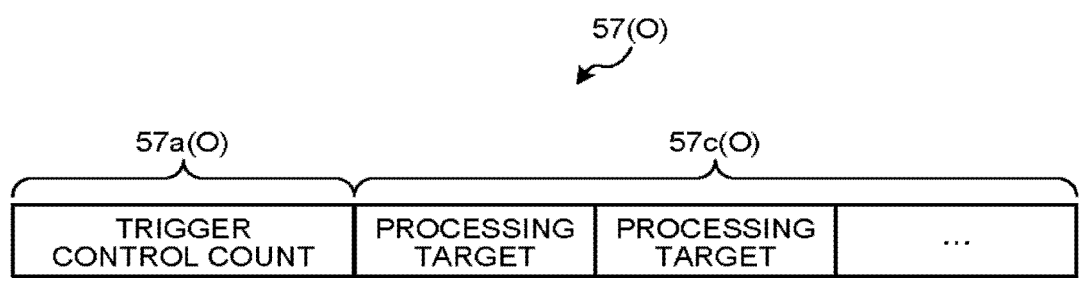
FIG. 9 is a diagram illustrating a storage area of a shared memory of the output system unit of the control apparatus according to the second embodiment.

Next, the control apparatus 5 according to a second embodiment of the present invention will be described with reference to the drawings. FIG. 8 is a diagram illustrating a hardware configuration of an output system unit of the control apparatus according to the second embodiment. FIG. 9 is a diagram illustrating a storage area of a shared memory of the output system unit of the control apparatus according to the second embodiment. In FIGS. 8 and 9, components that are the same as those in the first embodiment are given the same reference numerals and descriptions thereof will be omitted.

In the control apparatus 5 according to the second embodiment, the output system unit 30 is a functional unit and the input system unit 20 is another unit. The output system unit 30 includes an output circuit unit 55-2(O) instead of the input circuit unit 55(I) the input system unit 20 of the first embodiment, and an external input/output interface 56(O) is connected to the device 3. The output circuit unit 55-2(O) is constituted by a D/A converter or a digital I/O.

As illustrated in FIG. 9, a shared memory 57(O) of the output system unit 30 includes a trigger-control-count storage area 57a(O) and a processing target storage area 57c(O). The trigger-control-count storage area 57a(O) is a setting functional unit that stores the number of trigger controls N. The processing target storage area 57c(O) stores processing targets of the functional processes of an internal control processor 52b(O) of a functional processing unit 52(O). The trigger-control-count storage area 57a(O) has the same configuration as the trigger-control-count storage area 57a(I) of the shared memory 57(I) of the input system unit 20 according to the first embodiment.

The processing targets to be processed by the functional processes of the functional processing unit 52(O) are written to the processing target storage area 57c(O), by the computer 6 via the CPU unit 10. The processing targets are written to the processing target storage area 57c(O) in the order starting from the processing target subjected to the functional process first. As many processing targets as the number of trigger controls N are written to the processing target storage area 57c(O) in the order of the processes performed by the internal control processor 52b(O). As many processing targets as the number of trigger controls N stored in the processing target storage area 57c(O) are acquired by the MPU 52a(O) of the functional processing unit 52(O). The address of the processing target storage area 57c(O) is set in the CPU unit 10 in advance. The CPU unit 10 writes values to an area of the preset address, thereby writing as many processing targets as the number of trigger controls N. As many processing targets as the number of trigger controls N are written to the shared memory 57(O) from the computer 6 via the CPU unit 10, and thereby the shared memory 57(O) functions as an input control unit to which multiple processing targets of the functional processing unit 52(O) are collectively input from the outside of the output system unit 30 on the basis of the trigger signal TS. Therefore, in the second embodiment, the CPU unit 10 is a processing unit that collects and inputs processing targets to the shared memory 57 on the basis of the trigger signal TS.

In the second embodiment, the expression "the multiple processing results targets are collected and input" means that in the synchronization period T from when a trigger signal TS is input to when a next trigger signal TS is input, the CPU unit 10 that is an external unit collects and writes the multiple processing targets.

The internal control processor 52b(O) of the functional processing unit 52(O) of the output system unit 30 performs a functional process for processing the processing targets stored in the processing target storage area 57c(O) of the shared memory 57(O). After the output circuit unit 55-2(O) receives the processing results generated by the functional processes, the functional processing unit 52(O) of the output system unit 30 transmits the processing results to the device 3 through the external input/output interface 56(O) as control signals.

The functional processing unit 52(O) includes the MPU 52a(O) that stores a computer program and the internal control processor 52b(O) that performs a hardware process, and thereby the functional process of each processing target can be performed with the control period T1, which is shorter than the synchronization period T of the trigger signal TS, and a control signal of the device 3 can be generated. In the functional processing unit 52(O), during one synchronization period T of the trigger signal TS, the internal control processor 52b(O) repeatedly performs the functional process on each processing target a plurality of times, generates a control signal a plurality of times, and transmits the control signals to the device 3.

Figure 10:
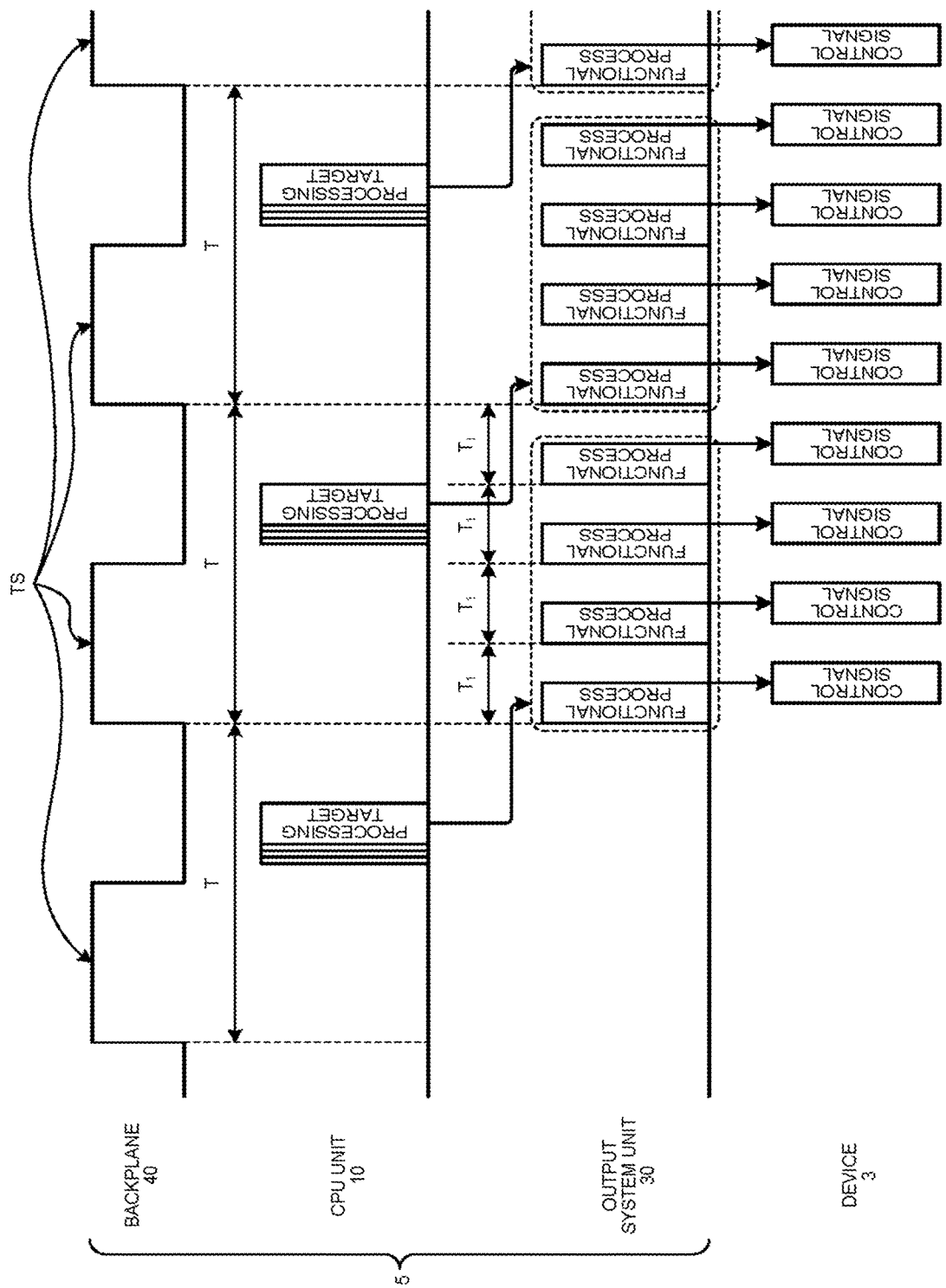
FIG. 10 is a time chart illustrating an example of an operation of the control apparatus according to the second embodiment.
Figure 11:
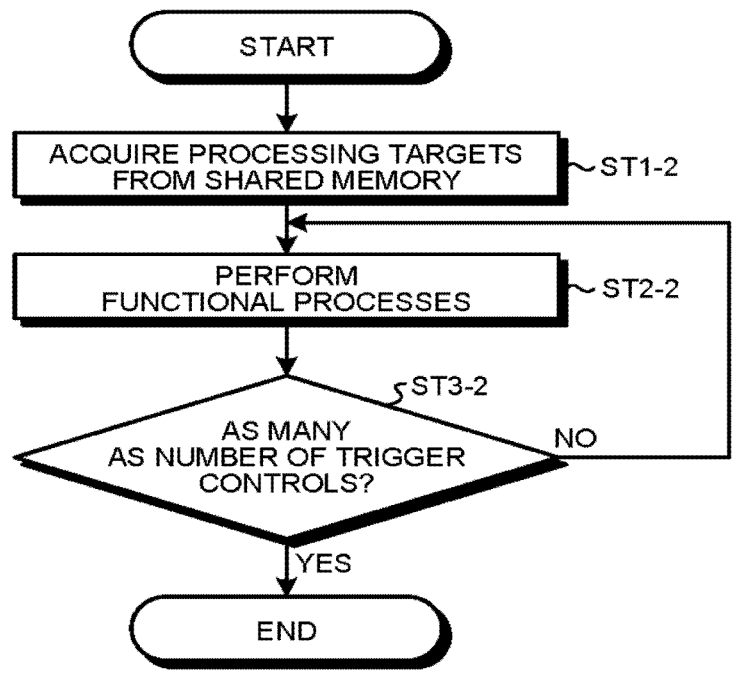
FIG. 11 is a flowchart illustrating an example of a process of a functional processing unit of the output system unit of the control apparatus according to the second embodiment.

Next, examples of operations of the output system unit 30 and the control apparatus 5 according to the second embodiment will be described with reference to the drawings. FIG. 10 is a time chart illustrating an example of the operation of the control apparatus according to the second embodiment. FIG. 11 is a flowchart illustrating an example of a process of the functional processing unit of the output system unit of the control apparatus according to the second embodiment.

As illustrated in FIG. 10, the trigger signal TS is input to the control apparatus 5 according to the second embodiment from the synchronous clock generation unit 42a of the backplane 40 with the fixed synchronization period T. When the trigger signal TS is input, the CPU unit 10 writes the processing targets input from the computer 6 to the processing target storage area 57c(O) of the shared memory 57(O) of the output system unit 30.

When a next trigger signal TS is input to the control apparatus 5, the functional processing unit 52(O) of the output system unit 30 receives the interrupt signal from the communication processor 51(O) at a rising timing of the trigger signal TS. The MPU 52a(O) of the functional processing unit 52(O) acquires the multiple processing targets from the processing target storage area 57c(O) of the shared memory 57(O) (Step ST1-2). In the second embodiment, when the stored processing targets are acquired by the MPU 52a(O) of the functional processing unit 52(O), the processing target storage area 57c(O) of the shared memory 57(O) is cleared by the MPU 52a(O) of the functional processing unit 52(O) so as to be in an empty state where no information is stored.

The internal control processor 52b(O) of the functional processing unit 52(O) of the output system unit 30 performs the functional processes on the processing targets and outputs the control signals to the device 3 as illustrated in FIG. 10 (Step ST2-2). The MPU 52a(O) of the functional processing unit 52(O) refers to the number of trigger controls N stored in the trigger-control-count storage area 57a(O) of the shared memory 57(O), and determines whether as many functional processes as the number of trigger controls N have been ended (Step ST3-2).

When the MPU 52a(O) determines that as many functional processes as the number of trigger controls N have not been ended (Step ST3-2: No), the process returns to Step ST2-2. When the MPU 52a(O) determines that as many functional processes as the number of trigger controls N have been ended (Step ST3-2: Yes), the functional processes for one synchronization period T are ended. When it is determined that as many functional processes as the number of trigger controls N have not been ended (Step ST3-2: No), the functional processing unit 52(O) repeats Step ST2-2, thereby performing as many functional processes as the number of trigger controls N as illustrated in FIG. 10, and the functional processing unit 52(O) outputs the control signals to the device 3.

In Step ST1-2, the MPU 52a(O) of the functional processing unit 52(O) of the output system unit 30 acquires the multiple processing targets from the processing target storage area 57c(O) of the shared memory 57(O), and thereafter, the CPU unit 10 writes the processing targets input from the computer 6 to the processing target storage area 57c(O) of the shared memory 57(O) of the output system unit 30, the processing target storage area 57c(O) having being cleared by the MPU 52a(O) of the functional processing unit 52(O) so as to be in an empty state where no information is stored.

The number of trigger controls N of the output system unit 30 of the control apparatus 5 according to the second embodiment is set in a similar manner to the first embodiment.

According to the output system unit 30 and the control apparatus 5 of the second embodiment, the functional processing unit 52(O) performs the functional processes with the control period T1, which is shorter than the synchronization period T of the trigger signal TS, on the basis of the trigger signal TS. According to the output system unit 30 and the control apparatus 5, the processing targets of the functional processing unit 52(O) are written from the outside to the shared memory 57(O), and the processing targets are collectively input. Therefore, in the output system unit 30 and the control apparatus 5, the functional processing unit 52(O) can perform the functional process a plurality of times in one synchronization period T. As a result, the output system unit 30 and the control apparatus 5 can utilize the high-speed functional processing performance of the output system unit 30. According to the output system unit 30 and the control apparatus 5 of the second embodiment, it is possible to transmit the control signals to the device 3, which is a drive device, with a period shorter than the synchronization period T.

According to the output system unit 30 and the control apparatus 5 of the second embodiment, since the functional processing unit 52(O) repeatedly performs the functional process starting from the trigger signal TS, it is possible to suppress variations in the control period T1 generated by the internal control processors 52b(O) when a plurality of output system units 30 are arranged in the system. Therefore, when the output system units 30 are arranged in the system, the output system units 30 can be synchronized with each other with a period obtained by further minimizing the synchronization period T determined by the PLC system, and can be controlled permanently.

Regarding the output system unit 30 and the control apparatus 5 according to the second embodiment, the number of trigger controls N is written from the computer program stored in the MPU 52a(O). Therefore, even if the synchronization period T will be shortened in the future, the output system unit 30 and the control apparatus 5 can flexibly cope with the shortened synchronization period T without modifying the internal control processor 52b(O) in a similar manner to the first embodiment. When the number of trigger controls N is written from the computer 6 via the CPU unit 10, the output system unit 30 and the control apparatus 5 allow the user to freely set the control period of the functional processes minimized beyond the synchronization period T. However, the shortest control period of the functional processes is the control period T1.

Third Embodiment

Next, a functional unit 70 according to a third embodiment of the present invention will be described with reference to the drawings. FIG. 12 is a diagram illustrating a hardware configuration of the functional unit according to the third embodiment. FIG. 13 is a time chart illustrating an example of an operation of the functional unit according to the third embodiment. In FIGS. 12 and 13, components that are the same as those in the first and second embodiments are given the same reference numerals and descriptions thereof will be omitted.

In the third embodiment, the functional unit 70 is the input system unit 20 or the output system unit 30 described in the first and second embodiments. The functional unit 70 includes the functional processing unit 52 as illustrated in FIG. 12. The functional processing unit 52 is a functional processing unit that, upon receiving a trigger signal TS, performs a functional process in a similar manner to the input system unit 20 or the output system unit 30 at a rising timing of the trigger signal TS. The functional unit 70 includes the shared memory 57 that includes a trigger-control-count storage area 57a in a similar manner to the input system unit 20 or the output system unit 30. The communication processor 51 of the functional unit 70 is connected to the computer 6.

In the third embodiment, when the functional unit 70 receives the trigger signal TS input by the user operating the computer 6, as illustrated in FIG. 13, the functional unit 70 performs as many functional processes as the number of trigger controls N written to the trigger-control-count storage area 57a. That is, the functional processing unit 52 of the functional unit 70 repeatedly performs the functional process as many times as the number of trigger controls N, starting from the trigger signal TS. In the third embodiment, the trigger signal TS is input from the computer 6 to the functional unit 70, but this is not a limitation. The trigger signal TS may be input from the outside of the functional unit 70 at a given timing, that is, the trigger signal TS may be aperiodically input. In the third embodiment, the functional unit 70 repeats the functional process as many times as the number of trigger controls N at the rising timing of the trigger signal TS, and thereafter the functional unit 70 performs a given process. However the given process may not be necessarily performed.

According to the functional unit 70 of the third embodiment, the functional processing unit 52 repeatedly performs the functional processing performance starting from the trigger signal TS in a similar manner to the first and second embodiments; therefore, it is possible to utilize the high-speed functional process of the functional unit 70.

The configuration described in each embodiment above indicates one example of the content of the present invention and can be combined with other known technology, and part thereof can be omitted or modified without departing from the gist of the present invention.

REFERENCE SIGNS LIST 5 control apparatus; 10 CPU unit (processing unit); 20 input system unit; 30 output system unit; 52 functional processing unit (functional processing unit); 57 shared memory; 57a trigger-control-count storage area (setting functional unit); 70 functional unit; T synchronization period; T1 control period; TS trigger signal.

The invention claimed is:

1. A functional unit synchronized with another functional unit on a basis of a trigger signal input from outside, the trigger signal having a synchronization period, the functional unit comprising:
    a functional processor configured to perform, on a basis of the trigger signal, a functional process with a control period that is shorter than the synchronization period, and to generate processing results obtained by repeatedly performing the functional process a plurality of times continuously in one synchronization period; and
    an output controller configured to collectively output the processing results of the functional processor to outside on a basis of the trigger signal.

2. A functional unit synchronized with another functional unit on a basis of a trigger signal input from outside, the trigger signal having a synchronization period, the functional unit comprising:
    a functional processor configured to perform, on a basis of the trigger signal, a functional process with a control period that is shorter than the synchronization period, and to generate processing results obtained by repeatedly performing the functional process a plurality of times continuously in one synchronization period; and
    an input controller configured to collectively receive processing targets of the functional processor from outside on a basis of the trigger signal.

3. The functional unit according to claim 1, wherein the functional processor repeatedly performs the functional process starting from the trigger signal.

4. The functional unit according to claim 1, wherein the functional processor sets the number of the functional processes performed in one synchronization period.

5. The functional unit according to claim 4, wherein $T>T1\times N$ is satisfied,
    where the synchronization period is denoted by T, the control period is denoted by T1, and the number of functional processes performed is denoted by N.

6. A control apparatus comprising:
    the functional unit according to claim 1; and
    a processor configured to process the processing results collectively and output to the outside by the output controller of the functional unit on a basis of the trigger signal.

7. A control apparatus comprising:
    the functional unit according to claim 2; and
    a processor configured to collectively input the processing targets to the input controller on a basis of the trigger signal.

8. The functional unit according to claim 2, wherein the functional processor repeatedly performs the functional process starting from the trigger signal.

9. The functional unit according to claim 2, wherein the functional processor sets the number of the functional processes performed in one synchronization period.

10. The functional unit according to claim 1, wherein in the synchronization period from when a trigger signal is inputted to when the next trigger signal is inputted, the output controller is configured to make the processing results acquirable by the another unit or transmit the processing results to the another unit.

* * * * *